(No Model.)　　　　　　　　S. J. EVANS.　　　　2 Sheets—Sheet 1.
WATER REGISTERING DEVICE.
No. 586,428.　　　　　　　　　　　　　Patented July 13, 1897.
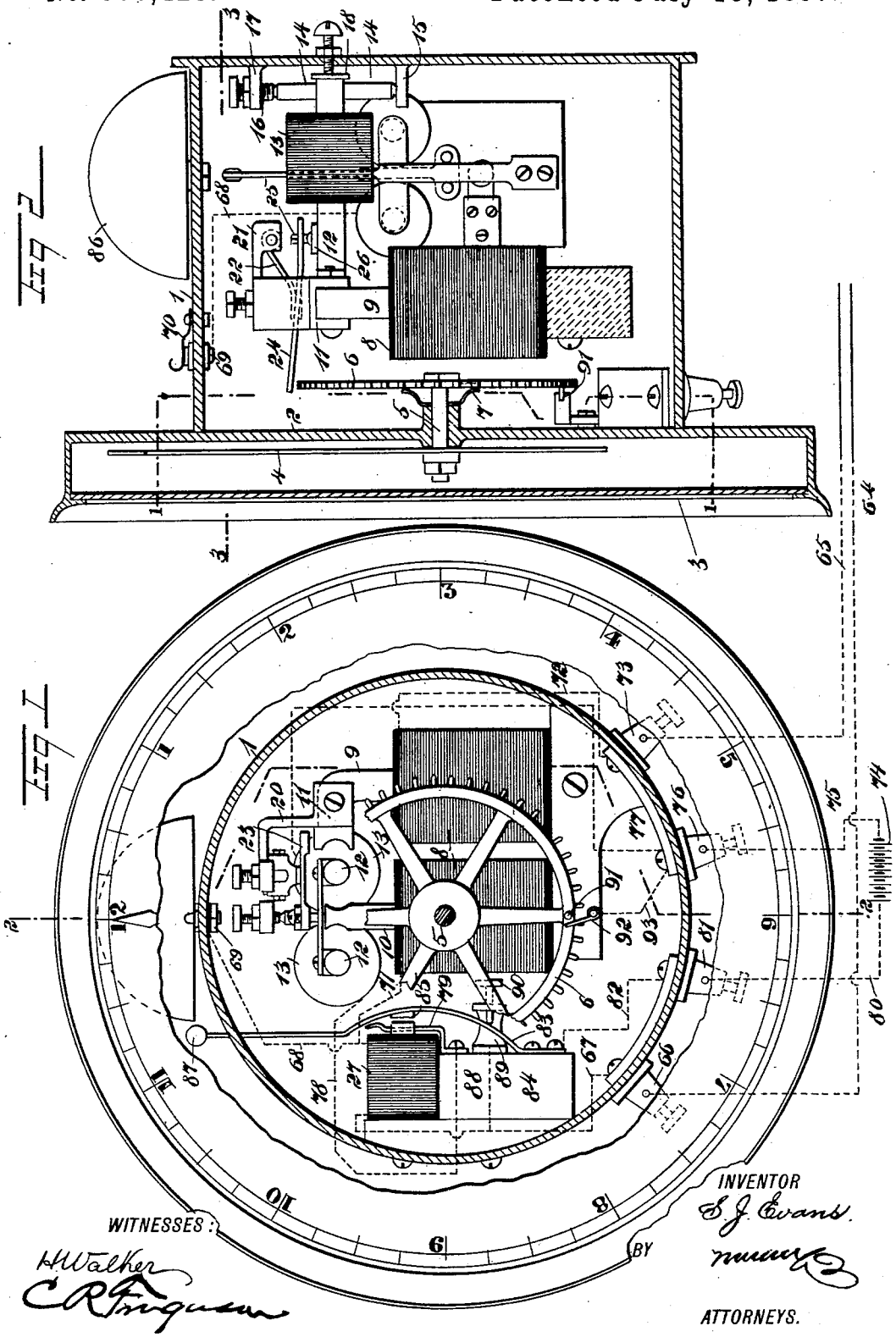

(No Model.) 2 Sheets—Sheet 2.
S. J. EVANS.
WATER REGISTERING DEVICE.
No. 586,428. Patented July 13, 1897.
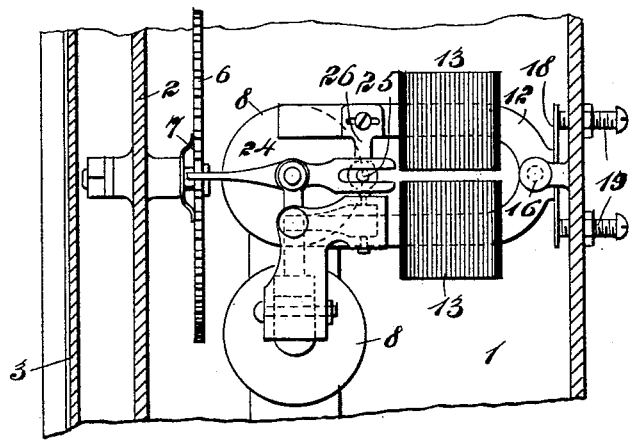
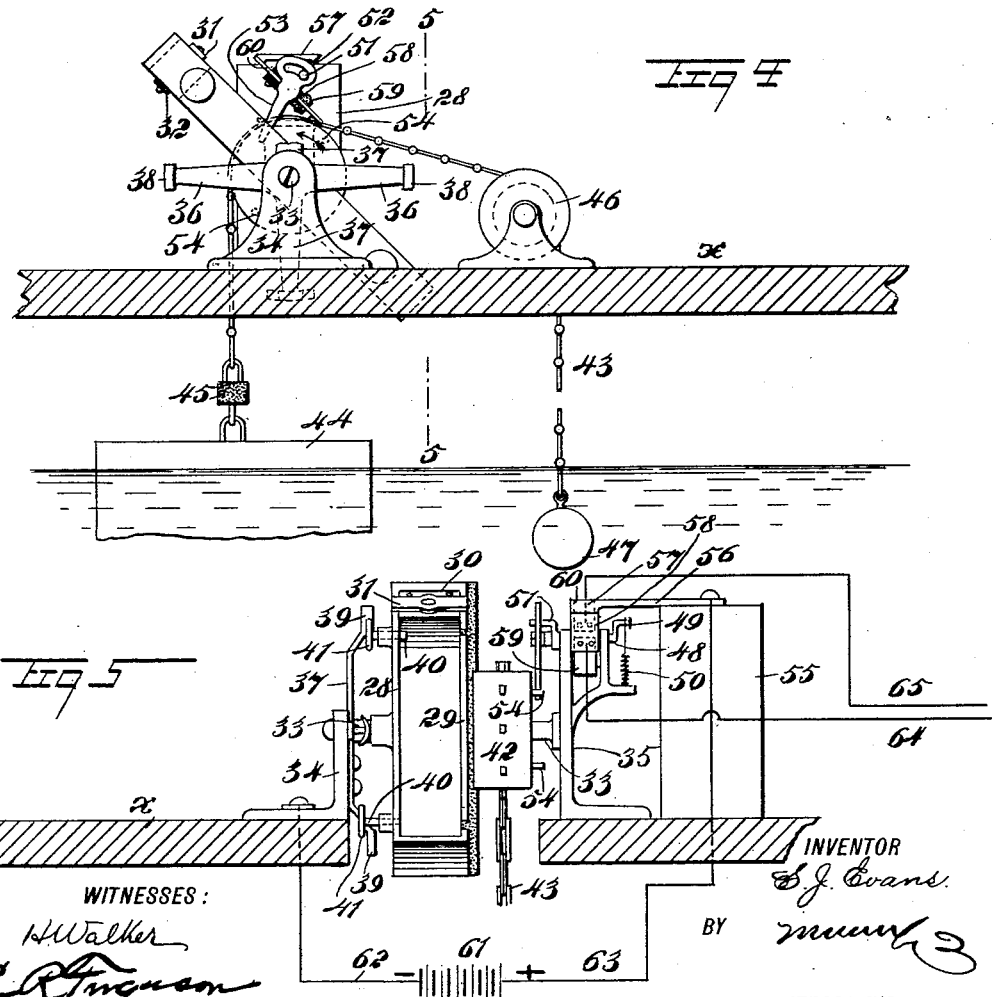
WITNESSES:
H. Walker
C. R. Ferguson
INVENTOR
S. J. Evans.
BY
ATTORNEYS.

UNITED STATES PATENT OFFICE.

SAMUEL J. EVANS, OF ELKHORN, WEST VIRGINIA.

WATER-REGISTERING DEVICE.

SPECIFICATION forming part of Letters Patent No. 586,428, dated July 13, 1897.

Application filed January 2, 1897. Serial No. 617,740. (No model.)

*To all whom it may concern:*

Be it known that I, SAMUEL J. EVANS, of Elkhorn, in the county of McDowell and State of West Virginia, have invented a new and Improved Water-Registering Device, of which the following is a full, clear, and exact description.

This invention relates to devices for indicating and registering the height of water in a tank or similar receptacle; and the object is to provide a simple device wherein an electric circuit is closed by means of a float controlled by the water in the tank, and by thus closing the circuit a registering mechanism placed at any convenient point will be operated.

I will describe a water-registering device embodying my invention, and then point out the novel features in the appended claims.

Reference is to be had to the accompanying drawings, forming a part of this specification, in which similar characters of reference indicate corresponding parts in all the views.

Figure 1 is a front elevation and partial section on the line 1 1 of Fig. 2 of a registering device embodying my invention. Fig. 2 is a section on the line 2 2 of Fig. 1. Fig. 3 is a partial plan view and partial section substantially on the line 3 3 of Fig. 1. Fig. 4 is a side elevation of a circuit-closing device arranged over a tank, and Fig. 5 is a front elevation and partial section on the line 5 5 in Fig. 4.

The registering device comprises a casing 1, of suitable metal, having a dial 2 on its front, here shown as graduated from "1" to "12" and as having a glass cover 3. Movable over the dial 2 is a pointer 4. This pointer 4 is mounted on a shaft 5, having a bearing through the dial 2 and supporting on its inner end a pointer-moving wheel 6. This wheel 6 is provided with forty-eight radial teeth, so spaced that one complete revolution of the wheel will register twelve feet, the space between adjacent teeth representing three inches. It is obvious, however, that the wheels may be made of any desired size and spaced to suit any desired measurement. A retarding-spring 7 is placed upon the shaft 5 and abuts against the hollow lug through which said shaft passes, and the free ends of this spring 7 bear upon the central portion of the wheel 6. The office of this spring 7 is to provide sufficient resistance to hold the wheel from accidental movement in either direction.

Arranged within the casing 1 are electromagnets 8, which I will term the "shifting" electromagnets. The cores 9 and 10 of the electromagnets 8 extend upward. The core 9 has a piece 11, bent inward at right angles or in a horizontal plane. These core-pieces 10 and 11 are in the line of movement of the core-pieces 12 of swinging electromagnets 13.

The electromagnets 13 are mounted to swing laterally in each direction. As here shown, the core 12 is made in the form of a horseshoe and the rear end is provided with a pintle 14, the lower end having a step-bearing in a block 15, extended from the rear wall of the casing 1, and the upper end having a bearing in a screw 16, adjustable in a bracket 17, extended from said rear wall of the casing. On the rear end of the core 12 is attached a spring-plate 18, the ends bearing on adjusting-screws 19, which pass through tapped holes in the rear wall of the casing. This spring-plate 18 is designed to return the swinging electromagnets to a central position, as will be hereinafter described.

Extended upward and then horizontally from the bent portion of the core 9 and secured to the same by a bolt is a bracket 20, from the horizontal portion of which an arm 21 extends rearward, and to this arm 21 is secured a spring 22, to the free end of which is attached an armature 23, coacting with the electromagnets 8. Pivotally connected to the armature 23 is a finger 24, the forward end of which extends over the wheel 6, and the rear end of said finger is provided with a slot-opening into which a pin 25 projects, this pin 25 being mounted on a cross-bar 26, mounted on the core 12. As here shown, the cross-bar 26 is provided with slot-openings through which screws pass into the core 12, so that said bar may be adjusted longitudinally of the core, if desired. Arranged within the casing 1 is an electromagnet 27, designed to control the swinging electromagnets 13.

I will now describe a circuit-closing device arranged over a tank, this device being shown clearly in Figs. 4 and 5. The device comprises a frame 28, consisting, essentially, of two side pieces of metal. One of these side pieces has a central strip 29, insulated from the other portions of the frame. Movable in the frame 28 is a sliding block 30, of suitable material. Upon the upper side of this block 30 is secured a metallic contact-piece 31, adapted to engage with the top edges of the opposite side walls of the frame 28, and the lower side of the block 30 is provided with a similar contact-piece 32, adapted to engage the opposite side pieces of the frame. The frame 28 is mounted to swing on a shaft 33, having a bearing at one end in a metal bracket 34, extended upward from the top of the tank $x$, and the other end of said shaft 33 is supported on a metal bracket 35, also secured to a board on the top of the tank.

Secured to the upper end of the bracket 34 and extending in both directions at right angles thereto are arms 36, and extended vertically in both directions are arms 37. The ends of the arms 36 are provided with curved shoes 38 and the ends of the arms 37 are provided with inwardly-extended fingers 39. Movable through tubular lugs on one side of the frame 28 and near the ends thereof are stop-pins 40, designed to support the sliding block 30 during an upward movement of the frame. When the frame is in a horizontal position, the curved shoes 38, by engaging the outer sides of the heads 41 on the pins 40, will force said pins inward and one of the pins will serve to support the block in its end of the frame while the frame is moving to a vertical position. When the frame shall have reached its vertical position, the fingers 39 will engage the inner surfaces of the heads 41 and draw the pins outward, thus releasing the sliding block, which at this time is at the top of the end of the frame, and then the said block will slide downward and close the circuit, as will be hereinafter described.

Mounted on and rotating with the frame 28 is a sprocket-wheel 42, over which a sprocket-chain 43 extends. One end of this chain 43 is attached to a wooden or other suitable float 44 within the tank. Preferably there will be an insulating-block connection 45 between the float and chain. From the sprocket-wheel 42 a chain 43 extends over a roller 46, mounted to rotate in blocks secured to the top of the tank $x$, and to this end of the chain 43 outside the tank is arranged a counterbalance metal weight 47.

Mounted to rock in the upper portion of the bracket 35 is a brush-carrying shaft 48, having at its rear end a cranked arm 49, to which one end of a spring 50 is attached, the other end of said spring 50 being attached to a projection from the bracket 35. The opposite end of the shaft 48 is provided with a crank-finger 51. This crank-finger 51 extends into an arc slot formed in the T-head portion 52 of a lever 53, mounted to swing on the shaft 48. The lower end of this lever 53 is designed to be engaged by either one of the pins 54, extended laterally from the wheel 42 in order to shift the direction of the electric current. Extended forward from a block 55 of insulating material is a contact-plate 56, having a T-head 57. Rigidly mounted on the shaft 48 is a block 58 of insulating material, having contact-plates 59 and 60 extended from its opposite ends.

Conveniently arranged and preferably near the tank is a main source of electricity. This main source of electricity is here shown as a battery 61, from one pole of which a wire 62 extends to an electrical connection with the bracket 34, and from the other pole of said battery a wire 63 extends to electrical connection with the contact-plate 56. The brushes 59 and 60 are connected, respectively, to the main lead-wires 64 and 65, designed to convey the main current to the electromagnets 8 and 27. The wire 64 connects with a binding-post 66 on the casing 1 of the registering device, and from this binding-post 66 a wire 67 extends to a connection with one end of the electromagnet 27, and from the other end of this electromagnet 27 a wire 68 extends to a spring-post 69, extended through the upper portion of the casing 1, but insulated therefrom and designed to be engaged at its outer end with a swinging switch-plate 70, having electrical connection with the casing. From the wire 68 a shunt-wire 71 extends to one end of the electromagnets 8, and from the other end of these electromagnets 8 a wire 72 extends to a connection with a binding-post 73 on the casing 1 and with which the main wire 65 is connected.

The swinging electromagnets 13 are designed to be energized by a local current controlled by the electromagnets 27. As here shown, this local current comprises a battery 74, from one pole of which a wire 75 extends to a connection with a binding-post 76 on the casing 1, and from this binding-post 76 a wire 77 extends to a connection with one end of the electromagnets 13. From the other end of the electromagnets 13 a wire 78 extends to a connection with a contact-finger 79, arranged forward of the electromagnets 27. From the opposite pole of the battery 74 a wire 80 extends to a connection with a binding-post 81 on the casing 1, and from this binding-post 81 a wire 82 extends to an electrical connection with a spring-arm 83, secured at its lower end to a block 84 of insulating material arranged in the casing 1 and extended upward in front of the electromagnet 27. This spring-arm 83 supports an armature 85, designed to be attracted by the electromagnet 27.

The switch mechanism 69 and 70 is designed to control the local current for sounding an alarm. This alarm consists of a gong 86, mounted on the top of the casing and designed to be struck by a hammer 87 on the upper end of the spring-arm 83. From the wire 67 a shunt-wire 88 extends to a connection with a bracket 89, attached to the insulating-block 84, and through a tapped hole in the outer portion of this bracket 89 is extended a contact-screw 90, adapted for engagement with the spring-arm 83. This gong 86 is designed particularly as a high and low water alarm, and the circuit for operating the same is closed upon a complete rotation of the wheel 6, as follows: Extended forward from the wheel 6 is a pin 91, adapted to engage with a swinging or spring-yielding contact-plate 92, secured on the rear side of the dial 2 and from which a wire 93 extends to the binding-post 76, which, as before stated, is in electrical connection with one pole of the battery 74. In the operation of this alarm mechanism, when the pin 91 engages with the plate 92 the circuit will be closed through the wires 93 75, the battery 74, the wires 80 82, and then through the spring-arm 83 to the screw 90, thence through the bracket 89, the wire 88, the wire 67, the electromagnet 27, the wire 68 to the switch-post 69, thence through the swinging switch-lever 70, the casing 1, and the dial 2, and through the wheel 6. Of course the arm 83 will be caused to make and break connection with the screw 90, which preferably is platinum-pointed. Another pin (not shown in the drawings) is designed to be situated on the side of the periphery of the wheel 6, according to the desired distance the water is allowed to lower before an alarm is to be sounded.

The operation of the registering device by the raising or lowering of the float 44 in a water-tank is as follows: As the wheel 42 is rotated by the lowering or raising of the float 44 the frame 28 will also be rotated, and when the frame reaches a vertical or perpendicular position the fingers 39 will draw the pins 40 outward. This will allow the sliding block 30 to slide to the bottom or lower end of the frame, and as the contact-plates 31 and 32 pass over the strip 29 the circuit will be completed from the battery 61 through the negative wire 62 to the bracket 34, thence through the shaft 33, through the contact-plates 31 and 32 and the frame to the bracket 35, which is in electrical contact with the plate 59, the said plate, as before stated, having connection with the main line or lead 64. The positive wire 63 from the battery 61 has connection with the plate 56. Therefore the current will be through this wire and plate to the plate 60, and thence through the main wire or lead 65. Of course when the sliding block 30 is at either extreme end of the frame 28 the circuit will be open. The main current is thus carried through the electromagnets 27 and the electromagnets 8. At this time the armature 85 of the electromagnet 27 will be attracted and cause the arm 83 to close the local circuit of the electromagnets 13. The energizing of the electromagnets 8 will draw the armature 23 downward, which will cause the finger 24 to engage against one of the teeth of the wheel 6, and then as the swinging electromagnets 13 are energized by the local-battery current the core 12 will act as a polarized armature for the magnets 8, so that the swinging magnets will be attracted and swung by the electromagnets 8, the pin 25 will cause the finger 24 to be rocked, and this movement will rotate the wheel one step or the distance between two teeth. When the circuit is cut out by the sliding block falling to the lower end of the frame 28, the finger 24 will be raised out of engagement with the wheel 6 and the swinging electromagnets 13 will be returned to a central position by means of the spring 18.

It will be remembered that each step of the wheel 6 will cause the pointer 4 to indicate on the dial 2 a certain distance which the water in the tank shall have raised or lowered. Should the wheel 42 be rotated in the direction of the arrow shown in Fig. 4, caused by the lowering of the float 44, it is obvious that the pins 54 on the wheel 42, by striking against the lever 53, will rock said lever without shifting the direction of the current or turning the shaft 48—that is, the arc-shaped slot in the head of the lever allows for this movement. Should, however, the water be rising in the tank when the parts are in the position shown in Fig. 4, one of the pins 54 will engage the lever 53 and by rocking said lever will rotate the shaft 48 a certain distance and the shaft will be rocked the remaining distance by the spring 50. This movement of the shaft 48 reverses the connections of the contact-plates—that is, it will cause the plate 60 to contact with the bracket 35 and the plate 59 to contact with the T-head of the plate 56.

Having thus described my invention, I claim as new and desire to secure by Letters Patent—

1. A registering device, comprising a main source of electricity controlled by a circuit-closer, an electromagnet in said main circuit, a swinging electromagnet comprised in a local circuit and adapted to be swung by the first-named electromagnet, an indicator operated by the coaction of said electromagnets, and an electromagnet in the main circuit for controlling the local circuit of the swinging electromagnet, substantially as specified.

2. A device for registering the height of water in a tank, comprising an electric circuit, a circuit-closer arranged on the tank and operated by the rising or falling of a float in the tank, a casing having a dial, a pointer movable over said dial, a toothed wheel on the shaft of said pointer within the casing, a vertical and laterally-swinging finger for rotating said wheel, an electromagnet for drawing said finger into engagement with the wheel, the said electromagnet being in the main circuit, an electromagnet mounted to swing laterally to impart a lateral swinging motion to the finger, a local circuit in which said swinging electromagnet is located, and an electromagnet in the main circuit for controlling the said local circuit, substantially as specified.

3. A device for registering the height of water in a tank, comprising a main electric circuit, a circuit-closer in said electric circuit and arranged on a tank or similar water-container, a float for operating said circuit-closer, an indicating device comprising a casing having a dial, a pointer movable over said dial, a toothed wheel on the inner end of the shaft carrying said pointer, a vertical and laterally-swinging finger adapted for engagement with the wheel, said finger being pivoted on an armature, an electromagnet in the main circuit for drawing said armature downward, a laterally-swinging electromagnet, a connection between the swinging finger and the swinging electromagnet, whereby the finger may be swung laterally by the movement of said swinging electromagnet, and another electromagnet within the casing and comprised in the main circuit, and a local circuit with which the swinging electromagnet is connected, the said local circuit being controlled by the last-named electromagnet in the main circuit, substantially as specified.

4. A device for registering the height of water in a tank, comprising a source of electricity, means for making and breaking the current at a water-tank, a casing having a dial on its front, a pointer movable over said dial, a toothed wheel on the inner end of the shaft of said pointer, a retarding-spring for the wheel, a vertical and laterally-swinging finger adapted for engagement with said wheel, said finger being pivoted on and carried by an armature, an electromagnet coacting with said armature, the said electromagnet being located in the main circuit, a swinging electromagnet carrying a pin on its core, the said pin passing into a slot formed in one end of the swinging finger, a local battery with which said swinging electromagnet has connection, a spring-arm arranged in the casing and carrying an armature, an electromagnet for attracting said armature, the said electromagnet being located in the main circuit, a contact-finger adapted for engagement with the spring-arm and a connection between said contact-finger and the swinging electromagnet, substantially as specified.

5. In an electric water-registering device, a register substantially such as described, an electric current for operating said registering device, a circuit-closer located over a tank or other water-container and comprising a rotary frame forming a portion of the circuit, a wheel carried by said frame, a chain extended over said wheel, a float on one end of said chain within the tank, a weight on the other end of said chain, a sliding block in said frame, contact-plates on said block for closing the circuit through the frame as the block moves from one end to the other thereof, and contact-plates having connection with the main current-wires, the said contact-plates being mounted on an oscillating shaft operated by a movement of the wheel, substantially as specified.

6. A water-registering device, comprising a source of electricity, a registering mechanism having electromagnets contained in said circuit, a circuit-closer comprising a metal frame mounted to rotate, one side of said metal frame being insulated from the other side, a sliding block in said frame, contact-plates on the block designed to close the circuit through the sides of the frame, a sprocket-wheel carried by said frame, a sprocket-chain extended over the sprocket-wheel and having a float on one end within the water-tank, a weight on the opposite end of said chain outside the water-tank, stop-pins extended through one of the side walls of the frame and designed to hold the sliding block in the ends of the frame, means for drawing said pins outward, and means for forcing said pins inward, substantially as specified.

7. A circuit-closer for a water-registering device, comprising brackets supported on the upper end of a water tank or vessel, the said brackets being within the electrical circuit, a shaft supported by said brackets, a metal frame on the said shaft, a float and a weight for causing a rotary movement of said frame, a sliding block in the frame, contact-plates on the block for closing the circuit through the sides of the frame, a rocking shaft supported on one of the brackets, a contact-plate arranged within the circuit, a pair of contact-plates rigidly mounted on said rocking shaft and having connection with the main lead wires, a spring connected at one end to the inner cranked end of the rocking shaft, a lever pivoted on said rocking shaft and having an arc-shaped slot in its head portion, and a crank-finger on the outer end of the rocking shaft engaging in said arc-shaped slot, substantially as specified.

8. A water-registering device, comprising a casing, an electromagnet in said casing, a main source of electricity controlled by a circuit-closer operated by the rise and fall of water in a tank, the said electromagnet being included in said circuit, a swinging electromagnet adapted to be moved laterally by the first-named electromagnet, a finger moved downward by the first-named electromagnet and rocked laterally by the swinging electromagnet, a toothed wheel with which said finger is designed to engage, a local circuit within which the swinging electromagnet is contained, another electromagnet in the main circuit for controlling the circuit of the swinging electromagnet, an alarm consisting of a gong, a swinging arm operated by the controlling-electromagnet, for striking the gong, and a pointer movable over a dial by the movement of the toothed wheel, substantially as specified.

SAMUEL J. EVANS.

Witnesses:
HARPER A. FRANKENFIELD,
JOHN EVANS.